United States Patent [19]

Senter et al.

[11] 4,157,800

[45] Jun. 12, 1979

[54] PIPE CLAMP

[76] Inventors: Robert L. Senter, 230 Termino, Long Beach, Calif. 90803; Millard Andrich, 3265 W. Lambert Ln., Tucson, Ariz. 85704

[21] Appl. No.: 865,958

[22] Filed: Dec. 30, 1977

Related U.S. Application Data

[63] Continuation of Ser. No. 712,234, Aug. 6, 1976, abandoned.

[51] Int. Cl.² .............................................. F16L 3/24
[52] U.S. Cl. .................... 248/72; 24/20 TT; 24/23 EE; 248/73; 248/74 R; 248/300
[58] Field of Search ............... 248/72, 73, 74 R, 74 B, 248/68 R, 62, 228, 300; 403/387; 24/20 EE, 23 EE, 20 R, 20 CW, 20 TT, 20 S, 20 LS, 20 W, 16 R, 73.5 A

[56] References Cited

U.S. PATENT DOCUMENTS

| 1,441,154 | 1/1923 | Johnson | 24/20 TT |
|---|---|---|---|
| 2,345,650 | 4/1944 | Attwood | 248/72 X |
| 2,972,461 | 2/1961 | Balbach et al. | 248/73 X |
| 3,066,903 | 12/1962 | Tinnerman | 24/23 EE X |
| 3,090,826 | 5/1963 | Cochran | 248/68 R X |
| 3,139,261 | 6/1964 | Tinnerman | 248/74 R X |
| 3,145,962 | 8/1964 | Kindorf | 248/68 R |
| 3,185,419 | 5/1965 | Kindorf | 248/73 |
| 3,370,815 | 2/1968 | Opperthauser | 248/68 R X |
| 3,417,951 | 12/1968 | Rebentisch | 248/73 X |
| 3,486,726 | 12/1969 | Kindorf et al. | 248/72 |
| 3,522,921 | 8/1970 | Lytle | 248/73 X |

FOREIGN PATENT DOCUMENTS

| 670887 | 1/1939 | Fed. Rep. of Germany | 248/72 |
|---|---|---|---|
| 1124412 | 10/1956 | France | 248/74 R |

Primary Examiner—Rodney H. Bonck
Attorney, Agent, or Firm—Smyth, Pavitt, Siegemund, Jones & Martella

[57] ABSTRACT

A pair of identical strap elements are provided, each of which comprises a first substantially planar rectangularly shaped end portion which is notched along its opposite edges to receive the inwardly turned edges of a channel member to which the pipe is to be clamped, a concave mid-section conforming with the curvature of the pipe and a planar opposite end portion which is initially formed with rectangular corners, but one of which corners is punched and bent inwardly at a right angle to the plane of the planar end portion to form a tab. The configuration of the punched-out tab is such as to provide a hooked end with the hook directed downwardly toward the concavity of the mid-section and an arcuate ramp leading to the cut-back in the end which forms the hook. In addition the outermost edge of the planar opposite end portion is notched inwardly toward the midsection to receive the hooked end of another strap element when two such elements are disposed oppositely for face-to-face engagement with each other and with their concave midsections abutting an arcuate area of the pipe. In such complimenting disposition of the two strap elements, when each hooked tab is brought into the notched edge of the other strap element and the opposing planar opposite end portions are squeezed together, the pipe becomes effectively clamped to the channel member.

5 Claims, 5 Drawing Figures

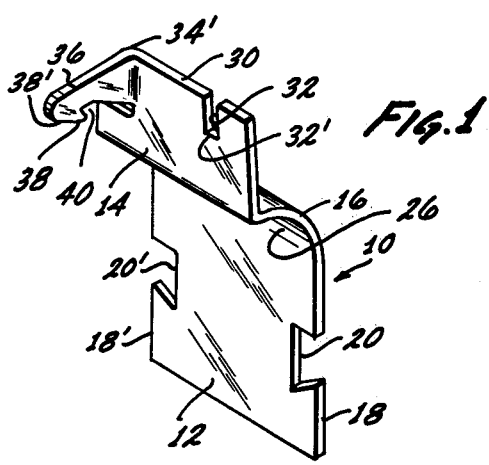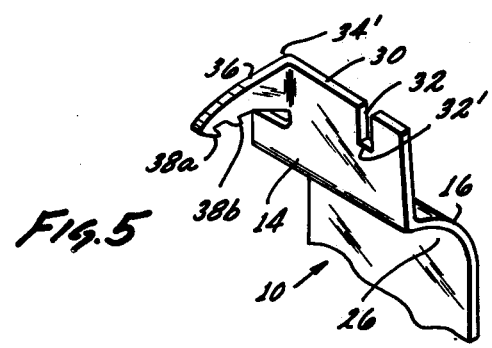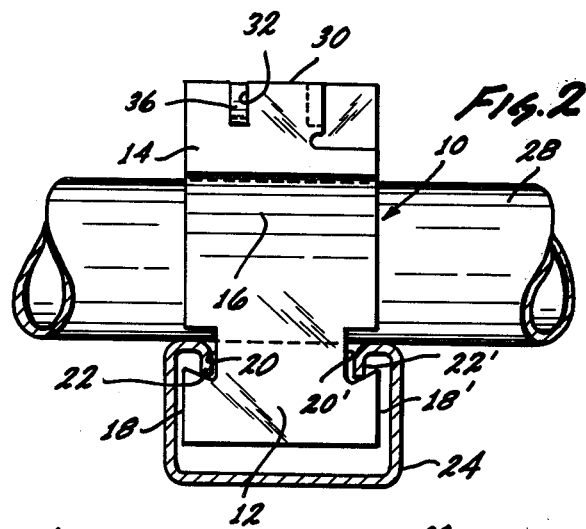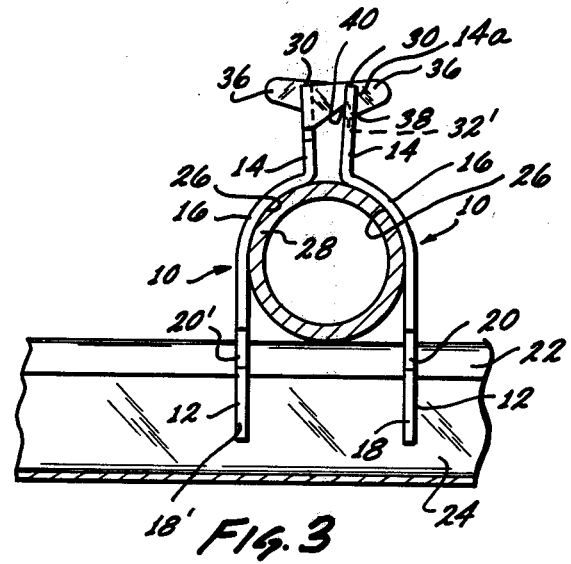

PIPE CLAMP

This is a continuation of application Ser. No. 712,234, filed Aug. 6, 1976, now abandoned.

BACKGROUND OF THE INVENTION

1. Field of the Invention

This invention relates generally to the construction field, and particularly to that area thereof which involves the installation of pipes and electrical conduits against channel members incorporated in the walls, ceilings, or floors of building structures.

2. Description of the Prior Art

For many years in building construction, metal channel members have been utilized to provide both support for building structures as well as to enable pipes and conduits to be mounted to, and to be carried by, such metal channel members. These channel members are usually U-shaped in cross-section and with turned-in edges, as illustrated in the following prior art U.S. Pat. Nos.: O. C. Kindorf; 3,145,962; O. C. Kindorf; 3,185,419; Opperthauser; 3,370,815; Rebentisch, Jr.; 3,417,951; R. D. Kindorf et al.; 3,486,726; Lytle; 3,522,921.

As may also be observed from these prior art patents, certain inventors have sought to devise straps or clamping means to enable a pipe or other tubular conduit to be secured for support on such channel members. Although the two patents to O. C. Kindorf disclose pipe straps or hangars which are secured together by some type of interlock without the use of a screw or bolt, the Kindorf devices disclosed in U.S. Pat. Nos. 3,185,419 and 3,145,962 do not appear to have been widely utilized since the clamps which, today, are accepted as standard in the construction industry, are those which are secured by a screw or bolt, as for example the device marketed by Unistrut Corporation of Wayne, Mich.

One problem with such bolt or screw type clamps is that, in use, a plumber or electrician not only must manipulate both clamps to dispose of each of their ends within the channel member and the opposite end in register to receive the bolt, but this also must be done about the pipe which, itself, sometimes must be held. Moreover, after the bolt is inserted to the registering orifices it then becomes necessary to place a nut off the end of the bolt and to thread the bolt into the nut or the nut on the bolt with either a screwdriver or a pliers. In inaccessible places, such clamping installations may sorely try the patience and skill of the plumber or electrician. In addition, it will be found that the usual time for each such installation is at least in the order of a minute. When this required installation time is multiplied by the many installations required in some building structures, it will be found that the cost of such installations becomes a substantial factor in the overall building costs.

The two O. C. Kindorf patents, however, reflect efforts on the part of this inventor to dispense with the necessity for bolting together the outwardly projecting ends of the pair of straps. In U.S. Pat. No. 3,145,962, the inventor sought to accomplish the interlock of the pipe-strap ends by providing oppositely projecting tangs, the ends of which must first be inserted in an opening in the face of the other strap, and then the ratchetted edges must be forced to pass by each other by a pliers or other squeezing device to accomplish the desired interlock. There have apparently been major practical problems with this type of strap, such as in the expense of punching out serrations of the type which are needed and which will not be abraided off when the two serrated edges are forced by each other. In addition, it would appear that disengagement can only be accomplished with considerable force by the use of a screwdriver or chisel as described in the patent specification. In any event, this type of strap does not appear to be in use in the industry and the inventor thereof, a year later, devised the different strap which is disclosed in his U.S. Pat. No. 3,185,419. This latter patent discloses a pair of straps, the ends of each of which are orificed and have a projecting tab. After the tab passes through the orifice in the opposite strap, the tab is twisted to prevent its withdrawal back through the orifice. This twisting requirement, which can be satisfied only by the use of pliers or other gripping tool, presents problems where the pipe is being installed in inaccessible areas. Moreover, the strap cannot be reused more than one or two times, if that many since, with the twisting of the tab, the metal structure would be weakened to where, after two or three twists the tab may actually break off. In any event, the strapping of this patent also does not appear to have been accepted in the industry which, as mentioned above, almost exclusively continues to utilize bolted pairs of straps. It would also appear that the greater weight or other downard force exerted on the devices of these Kindorf patents, the greater the possibility of their becoming ruptured.

SUMMARY OF THE PRESENT INVENTION

The present invention provides strapping means which most conveniently and rapidly enable a plumber or electrician to mount a pipe on a channel member. The only tool required is a pliers—preferably of the channel lock or water pump type. According to the present invention, each of a pair of strap elements is notched on the outer edge of its planar edge which extends from the arcuate midsection, and a hooked tab is provided to extend from a corner spaced from such notch. In order for the strap elements to become interlocked, the hooks of both tabs must drop into the respective notches of the oppositely disposed strap element, and this is accomplished by simply applying squeezing pressure to the planar ends of both strap elements. Once the interlock is thus accomplished because of the angular orientation of the interlocking member, by contrast with prior art devices, the greater the pressure, the tighter the elements secure the pipe. However, even without pressure from the pipe, the interlock is assured by the spring tension of the two planar ends. To provide such spring tension the planar end of each strap is angled back slightly so that its plane would ultimately intersect the plane of the other planar end portion which is fitted into the U-shaped channel member.

The mounting of the straps may be simply accomplished by putting one gripper of the pliers on the outer face of one planar end portion and the other gripper of the pliers on the outer face of the planar end of the outer element and squeezing them together until the hooked tab ends drop into the notches in the opposite elements. To disengage the elements, one gripper of the pliers is placed on the outside edge of the planar end of one strap element, and the other gripper, under the hooked tab of the other element and the pliers twisted slightly to snap the one hooked tab out of its seating notch. As soon as one tab is disengaged the other hooked tab will readily become disengaged.

It will be appreciated by those skilled in the art that the present strapping may be manufactured very cheaply and can be employed to support a pipe by an installation which requires only a few seconds of time. Moreover, the strap elements may be readily disengaged and may be reused any number of times. Also, while strapping preferably may be made of metal, such as a resilient steel or aluminum, it may also be molded of a hard and resilient plastic for use in installations where metal would be subject to oxydizing or other chemically deteriorating gases or electrolysis.

BRIEF DESCRIPTION OF THE DRAWINGS

In the accompanying drawings,

FIG. 1 is a perspective view of a strap constituting the preferred embodiment of the present invention.

FIG. 2 is a side elevation partly in section showing the manner in which the strap is mounted to a channel member and about a pipe.

FIG. 3 is an end elevation partly in section showing a pair of straps being brought together to secure a pipe to a channel member.

FIG. 4 is a view similar to FIG. 3 but showing these straps interlocked after pressure has been applied to the planar ends.

FIG. 5 illustrates a modified embodiment of the tab of FIG. 1.

DESCRIPTION OF THE PREFERRED EMBODIMENT

Referring to FIG. 1 of the drawings, a strapping element of the present invention may be fabricated as a single die-punched steel piece 10 which is comprised of one planar end portion 12, and an opposite planar end portion 14 which are integrally bridged by a concave midsection 16. The side edges 18, 18' of the planar end portion 12 are notched at 20 20' to receive the in-turned edges 22, 22' of a U-shaped channel member 24, as shown in FIG. 2. The concavity 26 of the midsection 16 desirably has a radius of curvature which conforms to the radius of curvature of the outside of the pipe 28. As may be seen from both FIGS. 1 and 3, the plane of the planar end portion 14 is not parallel to the plane of the planar end portion 12, but angles slightly forward to intersect the latter plane.

The upper edge 30 of the planar section 14 is notched at 32, and there is punched inwardly from the corner 34' a hooked tab 36. The hook 38 overhangs a recess 40 and is configured with an arcuate ramp 38'.

In use, two elements 10 are inserted into the channel member 24 and rotated to dispose the turned-in edges 22, 22' of the channel member 24 into the notches 20, 20' of the element 10, with the two concave midsections 16 brought face-to-face and about the pipe 28. The hooked tab 36 of the planar end portion 14 of each thus oppositely faced strap element 10 will be found to be disposed in register with the slot 32 in the edge 30 of the planar end portions 14 of the other element 10. A pliers is then applied, with one of its grippers disposed on the outer facing side 14a of each planar end portion 14, and squeezed. Thereby, the bottom wall 32' of each notch 32 rides over the ramp 38' of each hook 38 until the edge 32' passes over the end of the hook 38 and into the recess 40. When each tab 36 is thus secured in the notch 32 of the opposite element 10, the pipe will be found to be held firmly and securely in the manner illustrated in FIG. 4, and held under spring tension with the planar portions 14 maintained in parallel with the planar end portions 12.

Where it is desired to provide a gradation in the tightening of the strapping clamps, a plurality of hooks 38a, 38b may be provided as illustrated in FIG. 5.

We claim:

1. An element of a clamp used for affixing a pipe onto a channel extending perpendicularly to the pipe under the pipe, said clamp being of the type consisting of two identical unitary elements disposed facing each other on the right and left sides of the pipe and engaging the channel on the right and left sides of the pipe, extending around the pipe from opposite sides and interlocking to embrace the pipe to secure it to the channel, said element on the right side of the pipe comprising:

a first end portion including retaining means for engaging the channel on the right side of the pipe;

a concave midsection extending from said first end portion upwardly away from the channel and shaped to extend partly around the upper portion of the pipe to hold the pipe against the channel; and, an opposite end portion extending from said concave midsection upwardly and outwardly from the pipe and including an edge extending parallel to the pipe and further including a tab extending from said opposite end portion over the pipe toward the left, said tab including a ramp extending obliquely downwardly to the right to an upwardly extending recess, said ramp and said recess forming a hook extending downwardly from said tab for engaging the edge portion of the element on the left side of the pipe, said element being sufficiently resilient that as the opposite end portions of the elements are squeezed together, the ramp of each element first contacts the edge of the other element and with further squeezing is deflected upwardly to ride over the edge of the other element until the edge of each element snaps into the recess of the other element interlocking the elements over the pipe and securing the pipe to the channel.

2. The element of claim 1 wherein said opposite end portion except for said tab is substantially planar, wherein the plane of said opposite end portion is inclined upwardly to the right before the opposite end portions are squeezed together, and wherein the plane of said opposite end portion is deflected to lie in a substantially vertical plane when the elements are interlocked, the deflection of said opposite end portions producing a biasing force in said element for holding the hooks in the notches under tension.

3. The element of claim 1 wherein said edge is the bottom wall of a notch in said opposite end portion.

4. The element of claim 1 wherein said tab further includes more than one downwardly extending hook to provide a gradation in the tightening of the clamp.

5. The element of claim 1 wherein said ramp is arched convexly downwardly.

* * * * *